Oct. 28, 1924.  1,513,493
C. F. COWDREY
INDICATOR FOR BRAKE TESTERS
Filed March 26, 1923     2 Sheets-Sheet 2
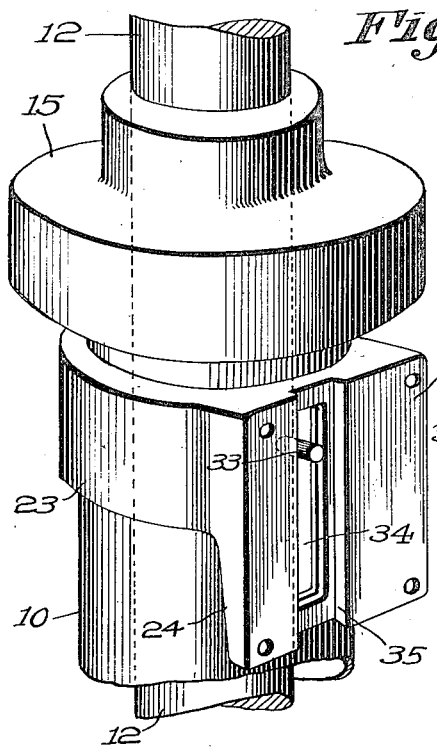
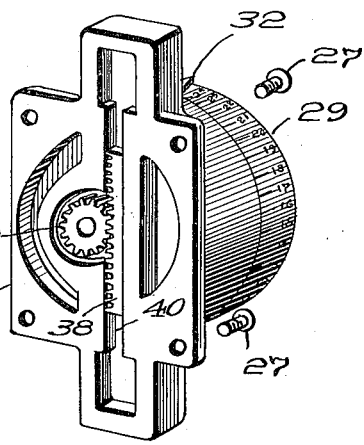
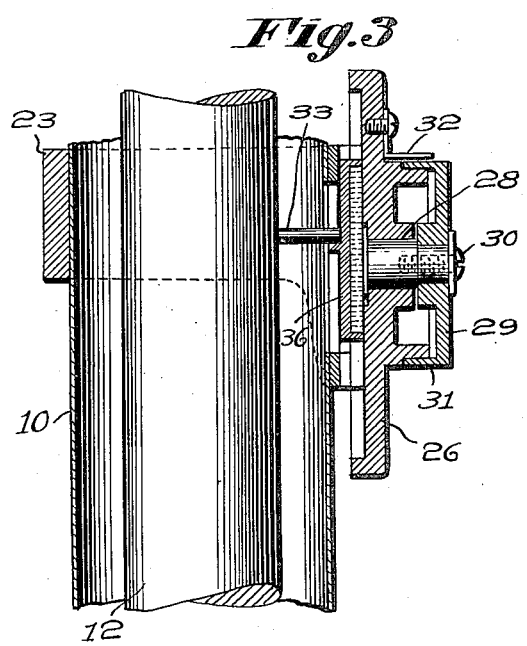
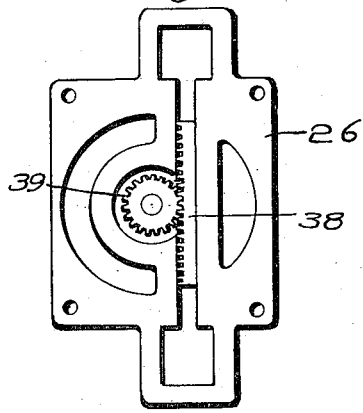
INVENTOR:
Charles F. Cowdrey
BY Robt. P. Harris
ATTORNEY Patented Oct. 28, 1924.

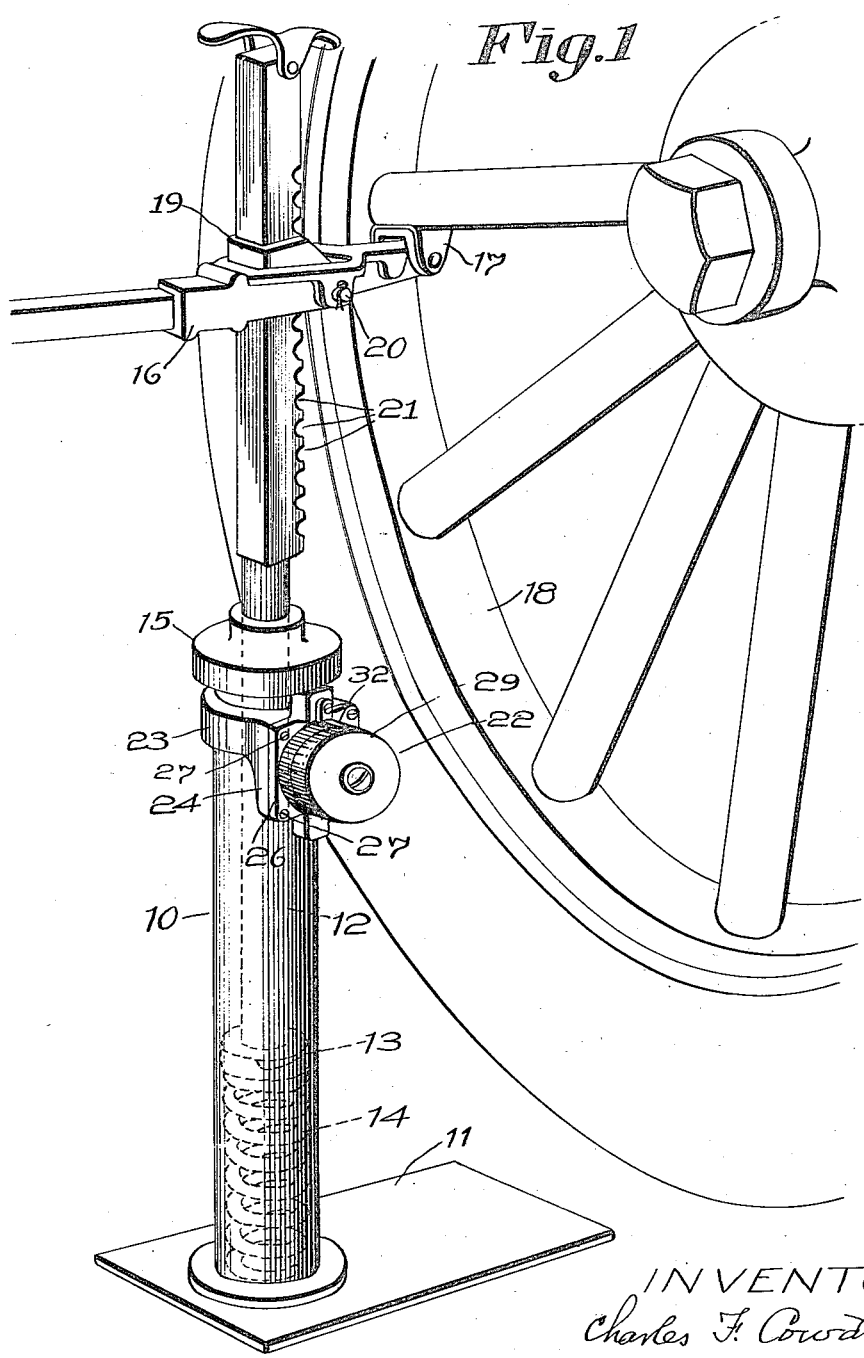

1,513,493

UNITED STATES PATENT OFFICE.

CHARLES F. COWDREY, OF FITCHBURG, MASSACHUSETTS.

INDICATOR FOR BRAKE TESTERS.

Application filed March 26, 1923. Serial No. 627,820.

*To all whom it may concern:*

Be it known that I, CHARLES F. COWDREY, a citizen of the United States, residing at Fitchburg, in the county of Worcester and State of Massachusetts, have invented an Improvement in Indicators for Brake Testers, of which the following description, in connection with the accompanying drawings, is a specification, like characters on the drawings representing like parts.

This invention relates to an indicator for automobile brake testers.

In United States Patent No. 1,440,970, granted to me, and in application Serial No. 596,584, filed by me October 24, 1922, are shown, described and claimed different brake testing devices for testing the condition of the brakes of automobiles.

The brake testing devices of this patent and application, are provided with means for exerting a force upon a wheel of an automobile that is sufficient to turn the wheel under brake resistance, and indicating devices are provided for indicating the force required to turn a wheel under a particular application of the brake.

The present invention relates to an improved indicator which is well adapted for use upon the brake testing devices above referred to, or upon various other types of brake testers.

One important feature of the present invention resides in an indicator having a rotating head which is graduated so that the reading of the indicator may be readily observed from a position above the same, in order that a person standing near the brake testing device may readily note the reading of the indicator without stooping or bending over to an uncomfortable position.

Another important feature of the invention resides in an indicator which will not only indicate, but will record the maximum force that is applied to a wheel to turn the same under brake resistance.

And still another feature of the invention resides in novel means for imparting operating movement from the brake testing device to the cooperating indicator.

Other features of the invention and novel combination of parts in addition to the above will be hereinafter described in connection with the accompanying drawings which illustrate one good practical form thereof.

In the drawings:

Fig. 1 is a perspective view of a brake testing device in operative position adjacent an automobile wheel and having the indicator of the present invention applied thereto.

Fig. 2 is a perspective view of a portion of the brake testing device of Fig. 1 and shows the supporting bracket for the indicator.

Fig. 3 is a vertical sectional view through a portion of the brake testing device and through the indicator secured thereto.

Fig. 4 is a perspective view of the rear face of the indicating device, and

Fig. 5 is a rear elevation of Fig. 4.

The indicator of the present invention is well adapted for use upon various types of brake testers, and is shown as applied to the type of brake tester disclosed in my application, Serial No. 596,584, above mentioned.

This brake tester may be briefly described as consisting of an upstanding column 10 having a supporting base 11 at its lower end, and within the column 10 is slidably mounted a post 12 having an enlarged lower end 13 which rests on a coiled spring 14 which supports the post 12 so that it will yield downwardly under pressure. The post extends slidably through a cap 15 secured to the upper end of the column 10, and an operating lever 16 is supported by the upper portion of the post 12. This lever has a saddle 17 at one end thereof adapted to engage a spoke or other portion of the wheel 18, the brake of which is to be tested, and a rotating movement is imparted to the wheel by forcing the opposite end of the lever 16 downwardly. The lever 16 is pivotally secured to a bracket 19 by a pin 20, and this bracket may be adjusted to different positions lengthwise of the post 12, and may be supported in any desired position by the notches 21 formed in one face of this post.

As stated the present invention relates to an indicator which is adapted to cooperate with a brake testing device to indicate the force required to turn a wheel under brake resistance, and a simple and satisfactory type of indicator, and desirable means for supporting the same will now be described.

In the construction shown the indicator 22 is secured to one side of the column 10 near the upper end thereof, and to accomplish this a suporting bracket 23 is provided which embraces the upper part of the support 10, and the bracket has an enlargement 24 at one side thereof, formed with a flat face 25 to which the indicating device 22 is secured. In the embodiment of the invention shown, a face plate 26 is constructed to be rigidly secured against the face 25 by screws 27, and the face plate has a shaft 28 journaled therein to extend in a horizontal direction. To the outer end of the shaft 28 is secured a head 29 which is rotated by the shaft, and this head may be tightly secured to the shaft by a screw 30 threaded into the end of the shaft.

It is highly desirable that the indicators used in connection with brake testers for automobiles be so constructed that the indicator may be conveniently read from a position above the brake tester, so that a person engaged in testing the condition of the brakes of an automobile may readily observe the reading of the indicator without having to stoop or bend over to an uncomfortable position. The rotating head 29 of the present invention is, therefore, preferably provided with a laterally extending annular flange 31, upon the outer face of which the graduations are formed, as clearly shown in Figs. 1 and 4, and, as will be apparent from Fig. 3, the head has a somewhat cup-shaped configuration. A pointer 32 which indicates the point at which the reading is to be taken, and which cooperates with the graduations upon the head 29 is shown, in the present case, as secured to the face plate 26 above the rotating head 29; however, various means might be provided for indicating the point at which the reading is to be taken.

Means is provided for causing downward movement of the post 12 to rotate the head 29, and to this end in the construction shown the post 12 is provided with a laterally extending pin 33, the outer end of which extends into a vertical slot 34 formed in the enlargement 24 of the supporting bracket. In the outer face of the enlargement 24 is formed a groove 35 in which the plate 36 is slidably received, and this plate has a rearwardly extending lug 37 which is engaged by the pin 33, the construction being such that as the post 12 moves downwardly under pressure the pin 33 will engage the lug 37 and slide the plate 36 downwardly. The downward sliding movement of the plate 36 serves to operate the rack 38 having teeth which mesh with the gear 39 rigidly secured to the inner end of the shaft 28. In the construction shown the rack 38 is slidably mounted in a slot 40 formed in the inner face of the face plate 26, and lugs 41 and 42 extending laterally from the plate 36 engage the opposite ends of the rack 38 and impart a sliding movement thereto.

The operation of the mechanism for rotating the graduated head 29 is such that as the post 12 is forced downwardly, its downward sliding movement is imparted to the plate 36 by the pin 33, and the plate 36 serves to slide the rack 38 downwardly, which in turn rotates the gear 39, this rotates the shaft 28 and head 29 secured thereto. When the downward pressure upon the post 12 is relieved, the post will move upwardly under the action of the compressed spring 14, and the pin 33 will move upwardly without imparting a similar movement to the plate 36. This operation is desirable because it permits the indicating head 29 to remain in the position to which it was turned by the maximum downward movement of the post 12, and there preferably is sufficient friction between the operating parts to cause the head 29 to remain in the position to which it was rotated by the maximum downward movement of the post. In this respect the present indicator serves also as a recorder to indicate the last reading taken, and when it is desired to take another reading, the head 29 may be readily grasped by the fingers and rotated manually to its initial position.

The above described indicator is simple in construction, consists of but few parts, and is strong and durable, so that it is not likely to become injured or get out of order, and it serves not only to indicate the pressure required to rotate a wheel under a particular brake resistance, but serves also to record this pressure until the head is manually rotated from its last position.

What is claimed is:

1. In combination with an automobile brake tester having a column and a post supported thereby for downward yielding movement, an indicator supported adjacent the column and including a rotating head having a graduated peripheral surface, operating mechanism between the post and head for rotating the latter in one direction only, and friction means for holding the head in the position to which it is rotated by the maximum downward movement of the post.

2. In combination with an automobile brake tester having a column and a post supported thereby for downward yielding movement, an indicator supported by the column including a rotating head having a graduated peripheral surface, a toothed rack for imparting rotative movement to the head, and means upon said post for imparting movement to the rack as the post is depressed but which does not impart movement to the rack as the post returns to its normal elevated position so that the head will remain in its maximum position of rotation to record the extent to which the post is depressed.

3. In combination with an automobile brake tester having a rocking lever for rotating a wheel under brake resistance and a yielding support for the lever, an indicator actuated by the yielding movement of said support during the brake testing operation, and including a rotating head having a graduated peripheral flange disposed so that the graduations may be conveniently read from a position above the brake tester, and operating mechanism between the support and head for rotating the latter as the former yields under pressure.

4. In combination with an automobile brake tester having a column and a post slidably mounted therein for yielding downward movement, an indicator supporting bracket embracing the column, an indicator mounted upon the bracket and having a rotating head provided with a graduated surface, and means operated by the downward yielding movement of said post to rotate the head.

5. In combination with an automobile brake tester having a supporting column and a post guided thereby for downward yielding movement, an indicator supported by the column and including a fixed pointer and a graduated head rotatable adjacent the pointer, and means for imparting movement from the post to the head to rotate the latter as the former moves downwardly, including a slide adapted to be moved downwardly by the downward movement of the post and to be moved upwardly only by manual rotation of the head.

6. In combination with an automobile brake tester having a supporting column and a post guided thereby for downward yielding movement, an indicator supported by the column and including a fixed pointer and a graduated head rotatable adjacent the pointer, and means for imparting movement from the post to the head to rotate the latter in one direction only so that the head will remain in the position to which it is rotated by the post, including a gear for rotating the head, a slide mounted for vertical sliding movement and having a rack cooperating with the gears, and means between the post and slide for imparting the downward movement of the former to the latter.

In testimony whereof, I have signed my name to this specification.

CHARLES F. COWDREY.